Nov. 9, 1954 R. ANXIONNAZ ET AL 2,693,674
DRIVING DEVICE FOR TURBOJET BOOSTING AUXILIARIES
Filed July 21, 1950 3 Sheets-Sheet 1

INVENTORS
René Anxionnaz
& Marcel H. L. Sédille

By Watson, Cole, Grindle & Watson

Nov. 9, 1954  R. ANXIONNAZ ET AL  2,693,674
DRIVING DEVICE FOR TURBOJET BOOSTING AUXILIARIES
Filed July 21, 1950  3 Sheets-Sheet 2

INVENTORS
René Anxionnaz
+ Marcel H. L. Sidièle
By Watson, Cole, Grindle + Watson INVENTORS
René Anxionnaz
& Marcel H. L. Sédille
By Watson, Cole, Grindle & Watson

United States Patent Office 2,693,674
Patented Nov. 9, 1954

2,693,674

DRIVING DEVICE FOR TURBOJET BOOSTING AUXILIARIES

René Anxionnaz and Marcel H. L. Sédille, Paris, France, assignors, by direct and mesne assignments, of one-half to said Anxionnaz, and one-half to Societe Rateau (Société Anonyme), Paris, France, a company of France Application July 21, 1950, Serial No. 175,161

Claims priority, application France September 30, 1949

4 Claims. (Cl. 60—35.6)

Certain turbojet auxiliaries such as pumps for injecting water or a mixture of water and methanol, and fuel pumps for feeding post-combustion devices, are merely required to operate during boosted rates.

According to a known disposition, these auxiliaries are driven by the main driving shaft through appropriate gearings. Although the advantage of this method is to have a single drive, it is not very convenient as these auxiliaries absorb power even at normal non-boosted rate, this being detrimental to the economic operation of such engines and leading to special care for preventing the continuous drive of these auxiliaries from damaging them.

The present invention has for its object a device for driving turbojet boosting auxiliaries by means of one or more minor gas turbines fed with gas tapped on the main flow or one of the main flows.

Other objects and advantages of the invention will be apparent during the course of the following description.

Figure 1:
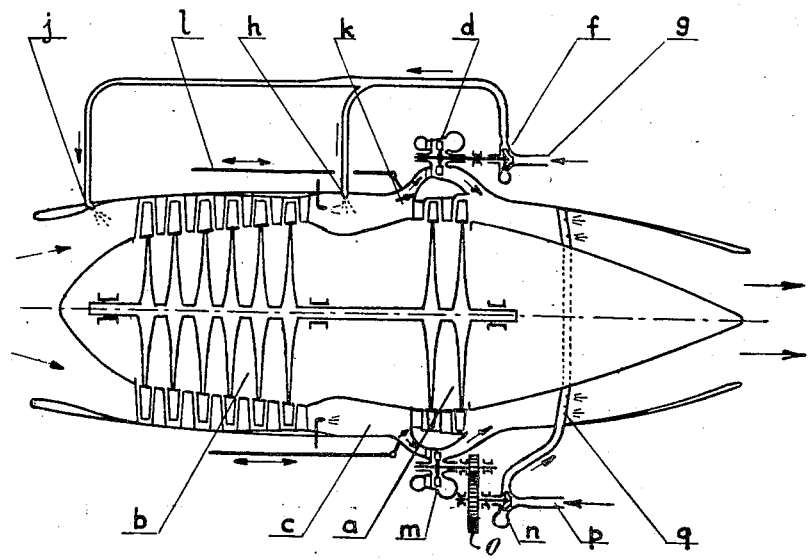
Figure 2:
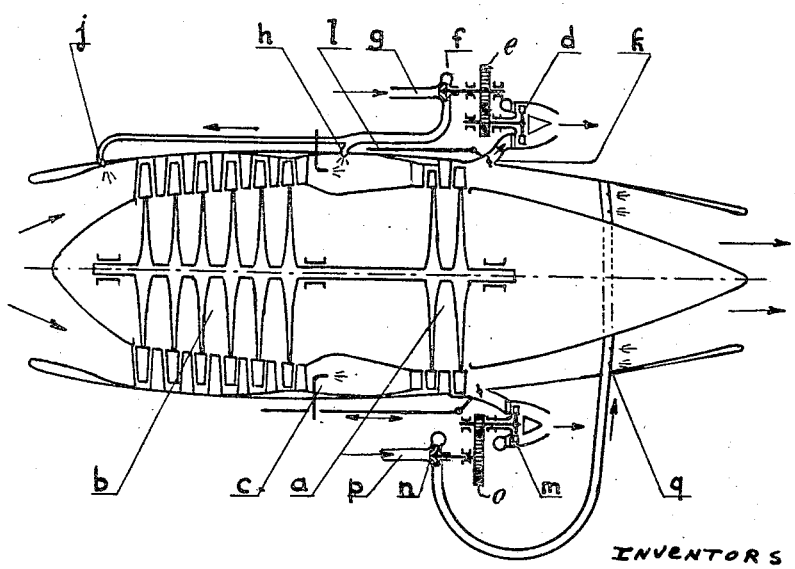
Figure 3:
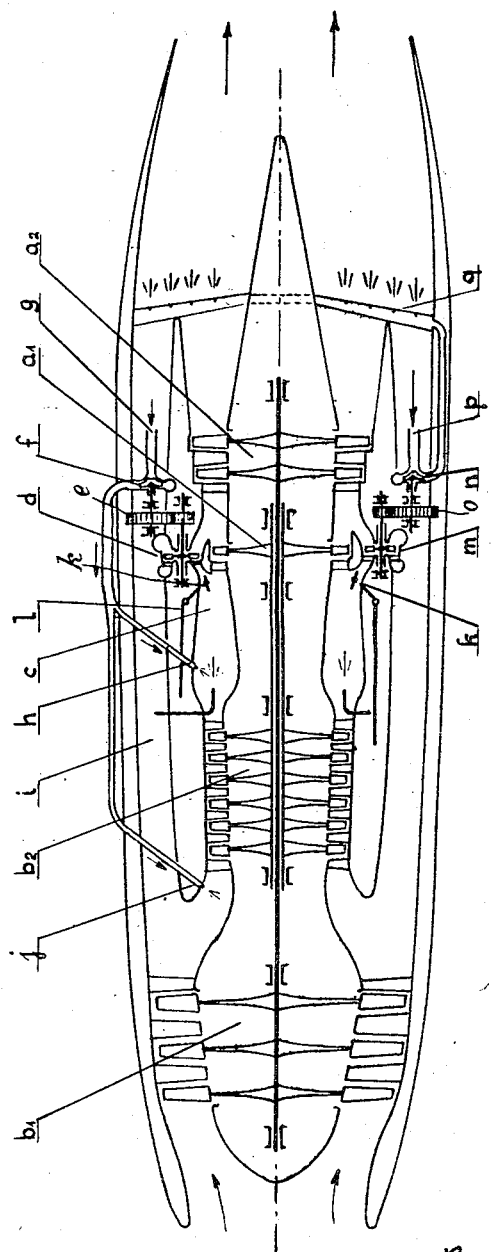
Figure 4:
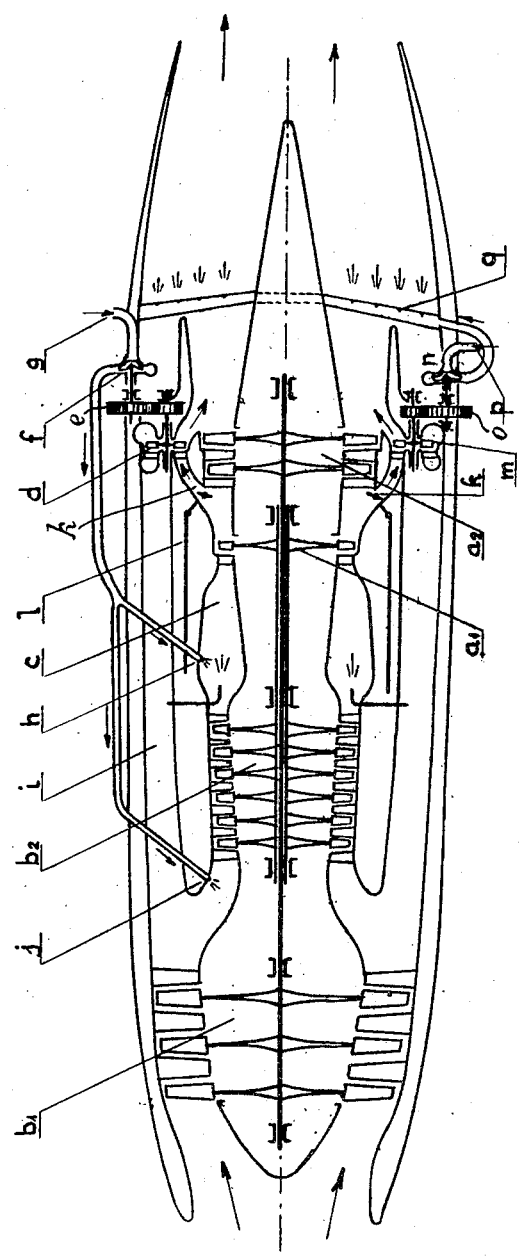

In the accompanying drawing forming a part of this application and in which like numerals are employed to designate like parts throughout the same, Fig. 1 is a diagram of a single-flow turbojet provided with an independent driving device for the auxiliaries, this device being fed with high-pressure motive fluid, Fig. 2 shows a similar turbojet with a device fed with expanded fluid, Fig. 3 is a diagram of a double-flow turbojet of the "dilution" type having two turbines, the driving device being fed with high-pressure motive fluid, and Fig. 4 shows the above turbojet wherein the device is fed with fluid after expansion in the first turbine.

As shown in Fig. 1, turbine $a$ directly drives compressor $b$ which discharges into combustion chamber $c$.

At the upper part, there is provided a small independent auxiliary turbine $d$ driving a water or water-methanol injection pump $f$ of any rotary type. The inlet $g$ of this pump is connected to the feed-tank (not shown) and its outlet to injectors $h$ and $j$. At normal rate, the auxiliary turbine $d$ is cut-off, its butterfly-throttle $k$ being closed. When the pilot wants to boost up the engine, he opens this throttle by acting on the linkage $l$ which can be actuated by means of a servo-motor (not shown). Part of the motive gas issuing from the combustion chamber $c$ is diverted towards the auxiliary turbine wherein it expands and wherefrom it flows into the exhaust of the main turbine $a$, thus driving the injection pump $f$.

At the lower part, a small auxiliary turbine $m$ similar to the previous one, can drive in an identical manner, a fuel injection pump $n$ of any rotary type, through a gearing $o$. The inlet $p$ of the pump is connected to the fuel tank (not shown) and its outlet to post-combustion burners $q$ required for boosting. The cutting-off and the actuation of this latter auxiliary turbine is effected as above.

It is to be noted that these auxiliary turbines only operating during short lapses, they may be highly tuned, this allowing use of very small units easily fitted up within the over-all dimensions of the turbojet.

The outputs of these auxiliary turbines being very low, it may be of interest to feed them with expanded fluid issuing from the main turbine, provided the bulkiness of these auxiliaries may be increased without prejudice. The device is, in such a case, as shown in Fig. 2 illustrating a similar turbojet.

The auxiliary turbines are supplied with motive fluid tapped at a point located down-stream with respect to the main turbine $a$ and they exhaust directly into the atmosphere parallelly to the propelling jet through the jet nozzle of the engine.

The disposition of the pumps and their pipings is identical to that of Fig. 1, as well as the control of these auxiliary turbines.

The application of the above device to double-flow turbojets gives rise to particular arrangements, when these engines comprise two independent turbines, as shown in Fig. 3.

In this figure, the high-pressure turbine $a_1$ directly drives the high-pressure compressor $b_2$ which discharges into the combustion chamber $c$.

The low-pressure turbine $a_2$ drives the low-pressure compressor $b_1$ which feeds both the high-pressure compressor $b_2$ and the outer duct $i$.

At the upper part, there is provided a small independent gas turbine $d$ fed with motive gas tapped at the high-pressure combustion chamber $c$ and exhausting after expansion into the low-pressure turbine $a_2$. This turbine drives, through a gearing $e$ a rotary injection pump $f$ discharging water or a mixture of water and methanol, the inlet $g$ of this pump is connected to the feed-tank and its outlet to the injectors $h$ and $j$. At normal rate, the turbine $d$ is cut-off, its butterfly-throttle $k$ being closed. When the pilot wants to boost up, he opens this throttle by means of the linkage $l$ which can be actuated by a servo-motor (not shown). Part of the motive gas is then diverted into the auxiliary turbine $d$ driving the injection pump $f$.

At the lower part of Fig. 3, a similar auxiliary turbine $m$ also supplied with motive gas issuing from the high-pressure combustion chamber $c$, drives similarly a fuel-injection pump $n$ of any rotary type, through a gearing $o$. Fuel is sucked in through the inlet pipe $p$ and discharged into the post-combustion burners $q$ required for boosting.

The cutting-off and actuation of this latter turbine are effected similarly as the former one.

The above high-pressure auxiliary turbines $d$ and $m$ can be replaced, as shown in Fig. 4, by low-pressure turbines fed with expanded gas issuing from the main high-pressure turbine $a_1$ and tapped at the intermediate chamber between turbines $a_1$ and $a_2$; the exhaust of these auxiliary turbines is connected to the exhaust of the main low-pressure turbines $a_2$, as shown in the figure, the general disposition remaining identical to the above one.

The disposition of Fig. 2 is also applicable to double-flow turbojets.

It is to be understood that the form of the invention herewith shown and described is to be taken as a preferred example of the same and that various changes in the shape, size and arrangement of parts may be resorted to without departing from the spirit of the invention or the scope of the subjoined claims.

What we claim is:

1. In combination with a ducted-fan turbine engine including an outer duct formed with an air-intake casing and a propelling nozzle and containing, in succession between said casing and said nozzle, a low-pressure air compressor and an inner duct spaced from the wall of said outer duct, said inner duct containing in succession a high-pressure air compressor, a combustion chamber, a high-output, high-pressure gas turbine fed with motive gas generated from said combustion chamber, and a high-output, low-pressure gas turbine fed with motive gas issuing from said high-pressure gas turbine, said gas turbines being drivingly connected to said air compressors, a boosting device comprising a pump adapted to suck up combustion promoting fluid and to discharge same into at least one zone of at least one of said ducts, a low-output gas turbine independent of said high-output gas turbines and drivingly connected to said pump, tapping means on said inner duct, downstream of said combustion chamber, for supplying said low-output gas turbine with a fraction of said motive gas, and throttling means for controlling said tapping means.

2. A boosting device as claimed in claim 1 wherein the tapping means is located upstream of the high-pressure gas turbine, said device further comprising connecting means between the exhaust of the low-output gas turbine and a zone of the inner duct between said high-pressure gas-turbine and the low-pressure gas-turbine.

3. A boosting device as claimed in claim 1 wherein the tapping means is located between the high-pressure gas turbine and the low-pressure gas turbine, said device further comprising connecting means between the exhaust of the low-output gas turbine and the inner duct downstream of said low-pressure gas turbine.

4. A boosting device as claimed in claim 1 wherein the low-output gas turbine is located within the over-all cross-section of outer duct.

References Cited in the file of this patent

UNITED STATES PATENTS

| Number | Name | Date |
|---|---|---|
| 2,336,232 | Doran | Dec. 7, 1943 |
| 2,487,842 | Whiteman et al. | Nov. 15, 1949 |
| 2,523,010 | Goddard | Sept. 19, 1950 |
| 2,531,761 | Zucrow | Nov. 28, 1950 |
| 2,551,229 | Alford et al. | May 1, 1951 |
| 2,640,316 | Neal | June 2, 1953 |

FOREIGN PATENTS

| Number | Country | Date |
|---|---|---|
| 864,397 | France | Jan. 17, 1941 |